Dec. 29, 1964  G. H. McLAFFERTY  3,163,379
SUPERSONIC SCOOP INLET
Filed Aug. 16, 1955  2 Sheets-Sheet 1

INVENTOR
GEORGE H. McLAFFERTY
BY
ATTORNEY

United States Patent Office 3,163,379
Patented Dec. 29, 1964

3,163,379
SUPERSONIC SCOOP INLET
George H. McLafferty, Manchester, Conn., assignor to United Aircraft Corporation, East Hartford, Conn., a corporation of Delaware
Filed Aug. 16, 1955, Ser. No. 528,643
6 Claims. (Cl. 244—53)

This invention relates to scoop inlets for inducting air at supersonic velocities.

It is an object of this invention to provide a supersonic scoop inlet which provides more than one compression surface thus reducing the required angle of the compression surface relative to the free stream.

A further object of this invention is to provide a scoop inlet having a base compression surface as well as two side compression surfaces to improve pressure recovery and reduce pressure drag.

These and other objects of this invention will become readily apparent from the following detailed description of the drawings in which.

Figure 5:
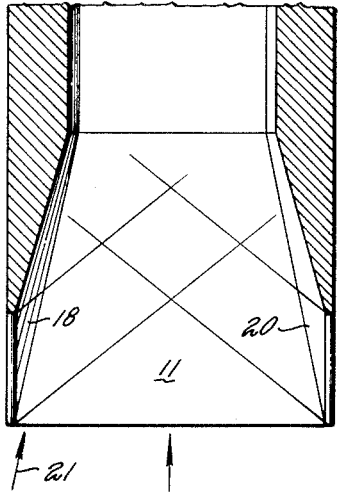
Figure 3:
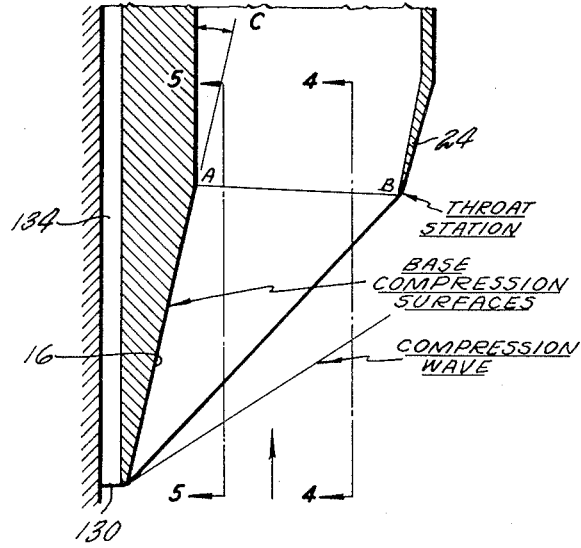
FIG. 3 is a cross-sectional view taken along the line 3—3 of FIG. 2.
Figure 4:
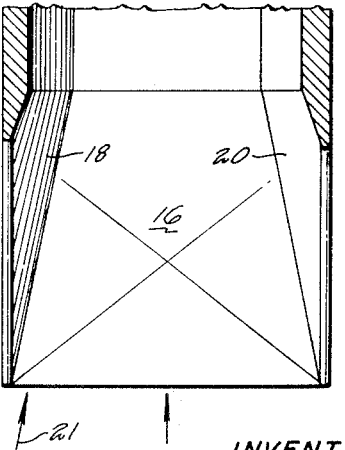

FIGS. 4 and 5 are cross-sectional views taken along the lines 4—4 and 5—5 of FIG. 3.

Figure 6:
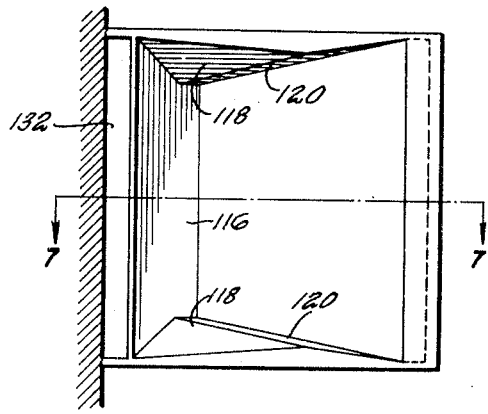

FIG. 6 is a front view of a modified version of the air scoop of this invention.

Figure 7:
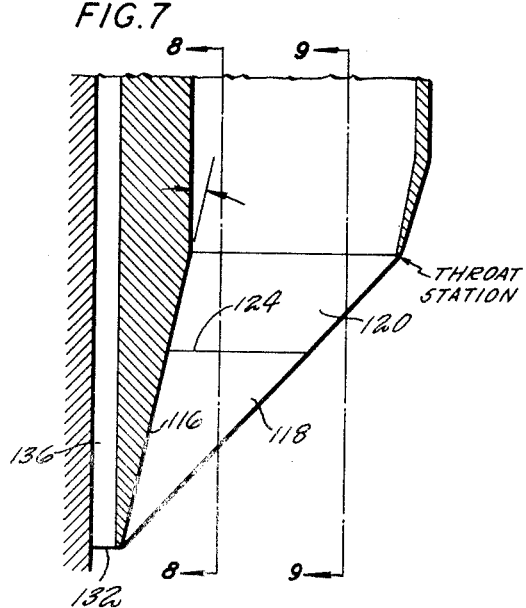

FIG. 7 is a cross-sectional view taken along the line 7—7 of FIG. 6; and

Figure 9:
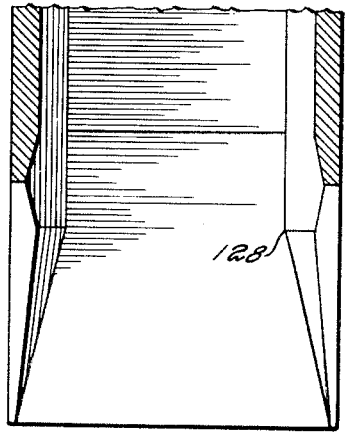
Figure 8:
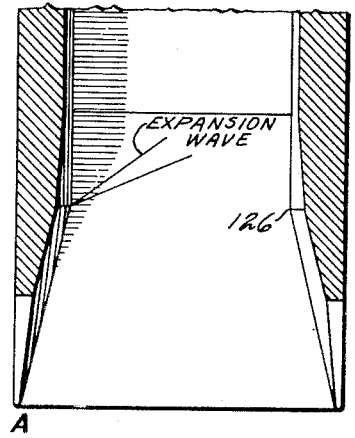

FIGS. 8 and 9 are cross sectional views taken along the lines 8—8 and 9—9 of FIG. 7.

Figure 1:
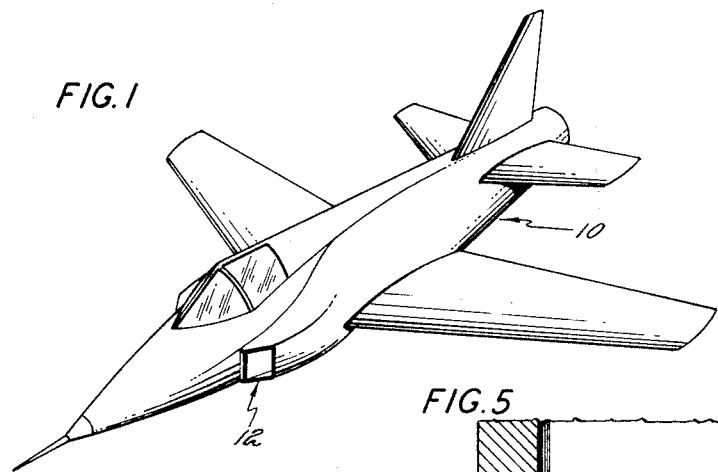
FIG. 1 is a perspective view of a typical aircraft utilizing the air scoop of this invention.

Referring to FIG. 1, an aircraft is generally indicated at 10 and a scoop inlet generally indicated at 12 for inducting air for the aircraft power plant or other uses. Scoop inlet 12 is shown as a front view in FIG. 2. Whereas conventional scoop inlets employ only the bottom or base of the inlet as a compression surface, this scoop inlet employs both the sides and the base of the inlet as compression surfaces. Hence, the scoop inlet of this invention is superior to a conventional scoop inlet in its range of stable operation, drag, pressure recovery and performance at angle of attack.

Figure 2:
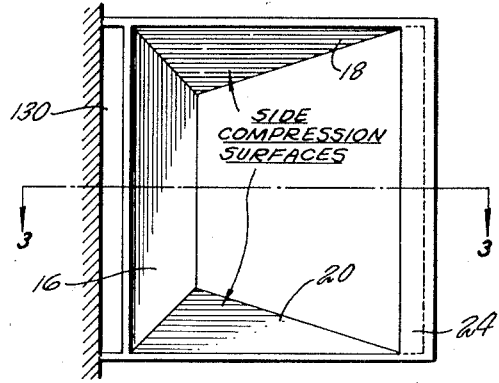
FIG. 2 is an enlarged front view of the air scoop.

Referring to FIGS. 2 and 3, the base compression surface 16 converges in a downstream direction relative to the axis of fluid flow. The side surfaces 18 and 20, rather than being straight walls, may be tilted relative to an axis perpendicular to the axis of airflow through the inlet. Thus, surfaces 18 and 20 where they join the base surface 16 are closer together but diverge in a direction toward the outer lip 24.

A particular advantage of this scoop inlet is that the air close to the bottom compression surface 16 as, for example, in the region marked A, is compressed more than the air close to the lip 24 or the region B. This extra compression is obtained because the compression waves from the side compression surfaces 18 and 20 in region A cross the complete width of the inlet upstream of the throat while those in region B cross only part of the inlet upstream of the throat. These compression waves at the Stations A and B are shown in FIGS. 4 and 5 respectively. Air spill from the inlet during subcritical operation will come from region B and since the air in region B has been compressed less than the other air entering the inlet, when any spillage of air occurs the average pressure recovery of this inlet will be greater than that of an ordinary inlet. In other words, when spillage occurs the air will flow around the outside of the lip 24 and this air being generally from the region B is of lower pressure than the remaining air across the inlet opening. Since the stability of an inlet is improved by obtaining an increase in pressure recovery as a result of decrease in airflow, the scoop of this invention will have a greater stable operating range than a conventional scoop inlet.

Furthermore, the turning angle C shown in FIG. 3 at the throat station is substantially reduced which results in a decrease in total pressure losses due to turning the flow at the throat. Also, the required angle of the lip 24 relative to and the free stream is reduced which, in turn, reduces pressure drag on the lip.

Conventional scoop inlets suffer loss in pressure recovery due to body angle of attack because the cross flow from the body results in separation inside of the windward surface of the inlet. Hence, this inlet reduces the expansion of the windward side surface (such as 20) of the inlet which occurs as a result of body angle of attack thus reducing the losses resulting from operation at angles of attack. In other words, when the aircraft is at an angle of attack the relative wind will be approaching from the lower portion of the inlet and some streamlines will flow around the side and into the inlet. Under these conditions if the side wall such as 20 were parallel with its opposite wall the air would have to turn around a sharp corner. Instead, the air approaches a wall such as 20 in a direction such as shown by the arrows 21 shown in FIGS. 4 and 5. Hence the air is substantially parallel to the wall 20 and no sharp turning is necessary.

The preceding applies both to the inlet described above and also to the modifications shown in FIGS. 6 through 9. As shown in FIGS. 6 and 7 a base 116 is shown as also are sidewalls, however, the sidewalls include symmetrical upstream portions 118 and downstream portions 120. Thus, rather than have the sidewalls converge continuously to the throat station the convergent is decreased a distance upstream of the throat station. Thus, the sidewalls have a definite change in convergence as shown in FIG. 6 and the change in contour is represented by the line 124 in FIG. 7 and the stations 126 in FIG. 8 and 128 in FIG. 9.

The openings 130 of FIG. 2 and 132 of FIG. 6 are intended to lead off boundary layer fluid. Likewise, the passages 134 and 136 of FIGS. 3 and 7 respectively are intended to receive and discharge the boundary layer fluid.

It will thus be apparent that an improved highly efficient scoop inlet has been provided which greatly improves pressure recovery and reduces drag while providing stable operation even at angles of attack.

Although, only two embodiments of this invention have been illustrated and described herein, it will become apparent that various changes and modifications may be made in the construction and arrangement of the various parts without departing from the scope of this novel concept.

What is desired by Letters Patent is:

1. In a scoop inlet for receiving air of supersonic velocity flowing over an upstream extending surface, an air contacting surface converging downstream relative to the axis of air flow and forming a base air compression surface which is the inner wall of said inlet for turning the air away from said extending surface, a pair of symmetrical surfaces located in planes transversely of said base surface and forming two other walls of said inlet, said surfaces converging in a downstream direction relative to the axis of air flow and having their leading edges forming a line sloping in a downstream direction and rearwardly from said base surface, and a wall spaced from said base surface and connected to said pair of surfaces.

2. In a scoop inlet for receiving air of supersonic velocity and having a longitudinal axis of flow therethrough, an air contacting surface converging downstream relative to the axis of air flow and forming a base air compression surface which is the inner wall of said inlet, a pair of symmetrical surfaces located in planes transversely of said base surface and forming two other walls of said inlet, said surfaces converging in a downstream direction relation to the axis of air flow and having their leading edges forming a line sloping in a downstream direction away from said base surface, and a wall including a lip downstream of said base surface and cooperating with said pair of surfaces to form the outer side of said opening, said wall forming a complete inlet.

3. In a scoop inlet for receiving air of supersonic velocity and having a longitudinal axis, an air contacting surface converging downstream relative to the axis of air flow and forming a base air compression surface which is the inner wall of said inlet and being the first to contact the airstream, a pair of symmetrical surfaces located in planes transversely of said base surface and forming two side walls of said inlet, said surfaces also converging in a downstream direction relative to the axis of air flow, and a fourth non-converging wall cooperating with said pair of surfaces to form a complete inlet, said fourth wall having a leading edge which is spaced from said inner wall and on the opposite side of said axis and downstream of the leading edge of said inner wall.

4. In a scoop inlet for receiving air of supersonic velocity flowing over an upstream extending surface, an air contacting surface converging downstream relative to the axis of air flow and forming a base air compression surface which is one wall of said inlet and which turns the air away from said upstream extending surface, a pair of symmetrical surfaces located in planes transversely of said base surface and forming two other walls of said inlet, said surfaces converging in a downstream direction relative to the axis of air flow and each including two surface portions in different planes, and a wall cooperating with said pair of surfaces to form the complete inlet.

5. In a scoop inlet for receiving air of supersonic velocity flowing over an upstream extending surface, an air contacting surface converging downstream relative to the axis of air flow and forming a base air compression surface which is the inner wall of said inlet, and a pair of symmetrical surfaces located in planes transversely of said base surface and forming two side walls of said inlet, each said surfaces having an upstream portion converging in a downstream direction relative to the axis of air flow and a downstream portion substantially parallel to the axis of air flow, each of said surfaces being tilted relative to an axis perpendicular to the axis of air flow, and a wall cooperating with said pair of surfaces to form the inlet.

6. A fluid contacting surface over which a fluid stream flows, a scoop inlet protruding from said surface for receiving air of supersonic velocity, said inlet having a longitudinal axis, an air contacting surface converging downstream relative to the axis of air flow and forming a base air compression surface which is the inner wall of said inlet and being the first to contact the airstream flowing over said fluid contacting surface, said base surface turning the flow in a direction outwardly and away from said fluid contacting surface, a pair of symmetrical surfaces located in planes transversely of said base surface and forming two side walls of said inlet, said surfaces also converging in a downstream direction relative to the axis of air flow and being tilted relative thereto, and a fourth nonconverging wall cooperating with said pair of surfaces to form a complete inlet, said fourth wall having a leading edge forming an outer lip which is spaced from said inner wall on the opposite side of said axis and downstream of the leading edge of said inner wall whereby a major portion of said base surface is upstream of said outer lip.

References Cited by the Examiner
UNITED STATES PATENTS 2,214,723    9/40    Holland _____ 244—53
2,480,036    8/49    Lloyd et al. _____ 244—57

MILTON BUCHLER, *Primary Examiner.*

SAMUEL BOYD, ARTHUR M. HORTON, *Examiners.*